US011010141B2

(12) United States Patent
Chatty et al.

(10) Patent No.: US 11,010,141 B2
(45) Date of Patent: May 18, 2021

(54) GRAPHICAL INTERFACE TO GENERATE INSTRUCTIONS TO CONTROL A REPRESENTATION BY AN OUTPUT INTERFACE OF ONE OR MORE OBJECTS

(71) Applicant: INTUILAB, Labege (FR)

(72) Inventors: Stéphane Chatty, Toulouse (FR); Alban Hermet-Chavanne, Labege (FR)

(73) Assignee: INTUILAB, Labege (FR)

( * ) Notice: Subject to any disclaimer, the term of this patent is extended or adjusted under 35 U.S.C. 154(b) by 8 days.

(21) Appl. No.: 16/064,157

(22) PCT Filed: Dec. 22, 2016

(86) PCT No.: PCT/EP2016/082464
§ 371 (c)(1),
(2) Date: Jun. 20, 2018

(87) PCT Pub. No.: WO2017/109122
PCT Pub. Date: Jun. 29, 2017

(65) Prior Publication Data
US 2018/0373504 A1    Dec. 27, 2018

(30) Foreign Application Priority Data
Dec. 23, 2015 (EP) ..................................... 15307138

(51) Int. Cl.
*G06F 8/38* (2018.01)
*G06F 8/34* (2018.01)
*G06F 3/0484* (2013.01)

(52) U.S. Cl.
CPC ............ *G06F 8/38* (2013.01); *G06F 3/04847* (2013.01); *G06F 8/34* (2013.01)

(58) Field of Classification Search
CPC ................................. G06F 8/38; G06F 3/04847
See application file for complete search history.

(56) References Cited

U.S. PATENT DOCUMENTS

| 5,481,741 A | 1/1996 | McKaskle et al. |
| 8,386,960 B1 | 2/2013 | Eismann et al. |

(Continued)

OTHER PUBLICATIONS

Tamas Meszaros et al., Visual Debugging Support for Graph Rewriting-based Model Transformations, IEEE, 2013, retrieved online on Jan. 28, 2021, pp. 482-487. Retrieved from the Internet: <URL: https://ieeexplore.ieee.org/stamp/stamp.jsp?tp=&arnumber=6625025>. (Year: 2013).*

(Continued)

*Primary Examiner* — Hanh Thi-Minh Bui
(74) *Attorney, Agent, or Firm* — Meagher Emanuel Laks Goldberg & Liao, LLP

(57) ABSTRACT

The invention relates to a method to generate computer instructions to control a representation of one or more objects, said representation being defined at least by attributes of said one or more objects, said method comprising: representing, in a graphical form, a source attribute of an object, possible values of the source attribute and one or more target attributes of said one or more objects; allowing a user to select a subset of the possible values of the source attribute; allowing a user to define a rule of transformation of the subset of the possible values of said source attribute into values of target attributes of said one or more objects; generating computer instructions configured to cause a processor to execute the rule of transformation.

12 Claims, 12 Drawing Sheets

(56) References Cited

U.S. PATENT DOCUMENTS

2007/0179641 A1* 8/2007 Lucas .................... G06F 9/451
                                                    700/83
2015/0046900 A1* 2/2015 Eldridge ............... G06F 3/0486
                                                    717/105

OTHER PUBLICATIONS

International Search Report for PCTEP2016/082464, dated Feb. 10, 2017.
Written Opinion for PCT/EP2016/082464, dated Feb. 10, 2017.

* cited by examiner

GRAPHICAL INTERFACE TO GENERATE INSTRUCTIONS TO CONTROL A REPRESENTATION BY AN OUTPUT INTERFACE OF ONE OR MORE OBJECTS

FIELD OF THE INVENTION

The present invention relates to the control of objects in an output interface. More specifically, it relates to the use of graphical interfaces to generate instructions that control the output of a software, said output being possibly a visual or auditory output, or an output of any other possible type.

BACKGROUND PRIOR ART

When developing a software application, or designing an animation for a portable device, a developer often wishes to offer the user of the application an interactive experience, wherein inputs of the user have a direct impact on the representation of the application. The representation of the application may be for example a visual and/or an auditory output, although other outputs are possible on some platforms (olfactory outputs, touch outputs such as vibrations, or any other output type through the use of actuating devices such as motors etc . . . ).

On a digital device, such as a smart phone or a tablet, the inputs of the user are usually detected by sensors connected to the device, and converted into software events, which are associated to input variables. For example, if a user moves around a portable device equipped with a gyroscope, the change of orientation of the portable device can be sensed by a gyroscope, and transformed by the operating system and made available to applications as an "orientation" event, having therewith associated an input value representative of the orientation of the device.

On the other hand, an output of an application is often defined by attributes of a plurality of objects that define a visual scene. For example, the scene of an application may contain a ball, having as attributes a color, a size, and/or a horizontal position and/or a vertical position. A rendering engine is responsible for the conversion of objects and attributes into values of intensity of pixels, which define the display which is directly seen by the user. The representation of an application may also contain other types of outputs. For example, the frequency and intensity of a sound may be set and the corresponding sound be played by speakers of the portable device.

A desirable property of an interactive application is to have outputs that evolve in a logical and user-friendly way in accordance to inputs. For example, the vertical position of a ball may evolve according to the horizontal position of a finger on the tactile surface of a tablet. Thus, when the user moves his/her finger left and right on the surface, the ball may move up and down, according to a position of the finger. It is also possible to synchronize a plurality of elements of the representation. For example, when the user moves his/her finger left or right, the ball may go up or down but may also, at the same time, have its size increase or diminish, while the frequency of a sound emitted by the device increases or decreases, etc. The definition of an output of a device according to an input of the user, and the synchronization of a plurality of outputs according to an input of the user, allow the creation of a friendly and reactive application that is intuitive for a user to manipulate.

A straightforward solution to build an interactive application that manages the outputs of a device based on the inputs of a user, another device or parameters of the device in an intuitive way is to code all correspondences between inputs and outputs. This consists in writing lines of code to capture events, retrieve corresponding input values, and assign a corresponding value to attributes of objects that will be rendered by a rendering engine. However this solution is often cumbersome, difficult to achieve and subject to many coding errors. Moreover, it is difficult to maintain. For example, if one wishes to modify a correspondence between input values and attributes of objects or add a further attribute to modify, one would have to modify lines of codes at a plurality of different locations in the program. This is a major issue at the design stage of an interactive application, when a developer may wish to iteratively modify a number of times the correspondences between inputs and outputs to test and improve the set of interactions with short cycles of development.

The Adobe Flash® Builder software discloses a graphical interface for synchronizing elements of a Flash animation. In this interface a timeline, disposed on top of the programming application, represents the elapsed time, starting from the launch of the animation. It is also possible to have a timeline specific to each component. Then, a designer of the animation can design, for different states of an object, a time-based animation. It is also possible, within the animation, to define the state of an object at a given time. For example, when starting the animation, the object takes successive states, as defined by the correspondence between the timeline and the state in the Adobe Flash Builder. This builder allows a rapid creation and modification of an animation, without major risk of errors. It also allows the designer of the animation to capture at a glance the successive states of an object, thus allowing an intuitive design of the animation.

However Flash Builder has major limitations. It is only able to define the behavior of an animation according to time. Meanwhile, the state of the object is only chosen amongst predefined states. The Adobe Flash® Builder software is thus unable to synchronize a plurality of objects and representations according to an input value other than the elapsing time.

There is therefore the need for a method and development tools to easily define and modify a correspondence between an input and one or more outputs of an application, while letting the developer choose a plurality of inputs and generating values of output which are not restricted to pre-defined states.

SUMMARY OF THE INVENTION

To this effect, the invention discloses a method to generate computer instructions to control a representation of one or more objects, said representation being defined at least by attributes of said one or more objects, said method comprising: representing, in a graphical form, a source attribute of an object, possible values of the source attribute and one or more target attributes of said one or more objects; allowing a user to select a subset of the possible values of the source attribute; allowing a user to define a rule of transformation of the subset of the possible values of said source attribute into values of target attributes of said one or more objects; generating computer instructions configured to cause a processor to execute the rule of transformation.

Advantageously, said source attribute has ordered values; allowing the user to select the subset of the possible values of the source attribute comprises representing, in the graphical form a line in which the user selects a minimum and a maximum value of the source attribute.

Advantageously, said source attribute has symbolic values representative of an object; allowing the user to select the subset of the possible values of the source attribute comprises representing, in the graphical form a list of possible symbolic values of the source attribute, in which the user selects the subset of the possible values as a subset of the possible symbolic values.

Advantageously, representing, in the graphical form, the source attribute of the object comprises: representing, on the graphical interface, a list of candidate source attributes; allowing the user to select said source attribute of the object in the list of candidate source attributes.

Advantageously, the method further comprises allowing the user to select said one or more target attributes.

Advantageously, the method further comprises filtering said one or more target attributes, based on the source attribute.

Advantageously, allowing the user to define a rule of transformation comprises allowing a user to parameter a pre-defined rule of transformation.

Advantageously, the method further comprises, prior to allowing a user to parameter the pre-defined rule of transformation, allowing the user to select the predefined rule of transformation in a list of candidate pre-defined rules of transformation.

Advantageously, allowing the user to define a rule of transformation comprises allowing the user to create the rule of transformation using operators and values of operands.

Advantageously, generating computer instructions configured to cause a processor to execute the rule of transformation comprises: generating computer code instructions configured to cause a processor to retrieve the value of the source attribute, based on at least one parameter of an event; generating computer code instructions configured to cause a processor to compute the value of the target attributes of said one or more objects, based on the value of the source attribute.

Advantageously, generating computer instructions configured to cause a processor to execute the rule of transformation comprises: generating computer code instructions configured to cause a processor to read the value of the source attribute, at least when a time interval elapses; generating computer code instructions configured to cause a processor to compute the value of the target attributes of said one or more objects, based on the value of the source attribute.

Advantageously, the object is one of: the one or more objects of the representation; an object representative of a device on which the representation is performed; an object of an environment of the device on which the representation is executed, attributes of which can be set by the device on which the representation is performed.

Advantageously, the method further comprises: allowing a user to select another subset of the possible values of the source attribute; allowing a user to select other target attributes of said one or more objects; allowing a user to define another rule of transformation of the another subset of the possible values of said source attribute into values of said other target attributes of said one or more objects; generating computer instructions configured to cause a processor to execute the another rule of transformation.

Advantageously, the rule of transformation transforms values in the subset of possible values of the source attribute into values of a first target attribute of said one or more objects, the another rule of transformation transforms values in the second subset of possible values of the source attribute into values of a second target attribute of said one or more objects, said second target attribute being different from said first target attribute.

Advantageously, the method further comprises defining a subset of possible values of a target attribute, the boundaries of which correspond to the application of the rule of transformation to the boundaries of the subset of possible values of the source attribute; defining an inverse rule of transformation of the subset of possible values of the target attribute into the subset of possible values of the source attribute; generating computer instructions configured to cause a processor to execute the inverse rule of transformation.

The invention also discloses a computer program product, stored on a non-transient computer readable medium, configured to generate computer instructions to control a representation of one or more objects, said representation being defined at least by attributes of said one or more objects, said computer code instructions being configured to: represent, in a graphical form, a source attribute of an object, possible values of the source attribute and one or more target attributes of said one or more objects; allow a user to select a subset of the possible values of the source attribute; allow a user to define a rule of transformation of the subset of the possible values of said source attribute into values of target attributes of said one or more objects; cause a processor to execute the rule of transformation.

The invention also discloses a computer program product to control a representation of one or more objects, said representation being defined at least by attributes of said one or more objects, said computer program product comprising computer code instructions configured to: obtain as input, values of a source attribute of said one or more objects; obtain a description of a rule of transformation of a subset of possible values of said source attribute into values of target attributes of said one or more objects; verify if values of the source attribute are within the subset of the possible values; if values of the source attribute are within the subset of possible values, execute the rule of transformation of values of said source attribute into values of target attributes of said one or more objects.

The invention also discloses a non-transient computer readable medium comprising a computer program product to control a representation of one or more objects of the invention.

The invention also discloses a device comprising a graphical interface to display a representation of one or more objects, said representation being defined at least by attributes of said one or more objects, said device being configured to: receive as input from a user using the graphical interface, values of a source attribute of said one or more objects; execute a computer program product to obtain values of one or more target attributes of said one or more objects, said computer program product comprising computer code instructions configured to: obtain a description of a rule of transformation of a subset of possible values of said source attribute into values of target attributes of said one or more objects; verify if values of the source attribute are within the subset of the possible values; if values of the source attribute are within the subset of possible values, execute the rule of transformation of values of said source attributes into values of target attributes of said one or more objects; display said one or more objects on the graphical interface according to the values of the attributes of said one or more objects.

The invention allows the user to intuitively synchronize the behavior and layout of a plurality of objects of a scene.

The invention allows the user of a representation to interact intuitively with this representation.

The invention allows a user to intuitively create animated scenes.

The invention is applicable to a great variety of different platforms and types of objects.

The invention is applicable to a large variety or representations including but not limited to visual representations, auditory representations, representations defined by real world objects connected to a device.

The invention is applicable to a large number of different source attributes.

The invention is applicable to both continuous and discrete target attributes.

The invention procures an even more intuitive interface by filtering target attributes and predefined models of rules of transformation based on the selected source attribute.

BRIEF DESCRIPTION OF THE DRAWINGS

The invention will be better understood and its various features and advantages will emerge from the following description of a number of exemplary embodiments and its appended figures in which.

DETAILED DESCRIPTION OF THE INVENTION

In this specification, the invention will be described by way of examples relative to the generation of computer instructions to control a visual representation of objects by a screen. However, the invention is not restricted to these examples, and can be applied for example on auditory representations, or a modification of attributes of an object connected to a device.

Figure 1:
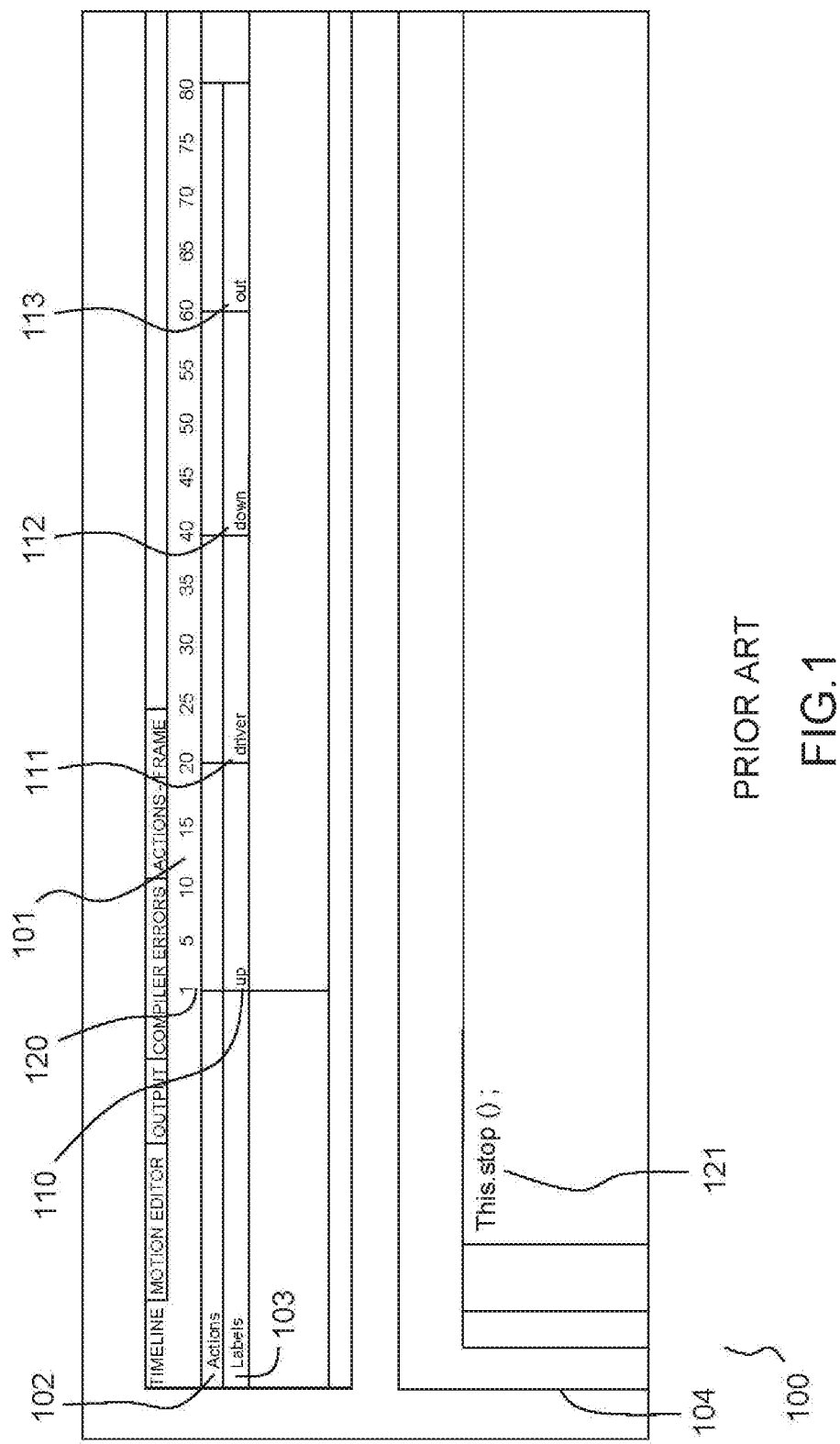
FIG. 1 displays an example of interface for designing an animation, by setting a state of an object to predefined values on a timeline, in the prior art.

FIG. 1 displays an example of interface for designing an animation, by setting a state of an object to predefined values on a timeline, in the prior art.

The interface 100 comprises several parts. The line 101 represents the time. The time "1" represents the time at which the animation starts, and the line is graduated with the time that elapses. The line 102 is used to add actions to the animation, and the line 103 to set labels representative of a state of an object. Area 104 is used to write scripts representative of actions to be performed at a given time. In this example, the time is expressed in seconds.

This interface can be used to perform actions at different times during the animation, and according to the states of object. In this example, a label representative of the state of an object can take the values "up" 110, "over" 111, "down" 112, and "out" 113 states, respectively at 1, 20, 40 and 60 seconds.

Meanwhile, the interface allows the user to define actions to be performed on the object at given times, or when the object switches in a given state. For example, at time 120, an action is defined in the script 121. In this example, the script is written in the Java language and the execution of the script makes the object stop.

Thus, this interface allows a user to define the temporal behavior of an object, by defining, for different times, states of the object and actions to perform. It is also possible to define such actions based on the state of the object, for example defining actions to perform when the object switches to the "up" state. However, it is not possible using prior art interfaces to define interactive applications based on input variables other than time.

Figure 2:
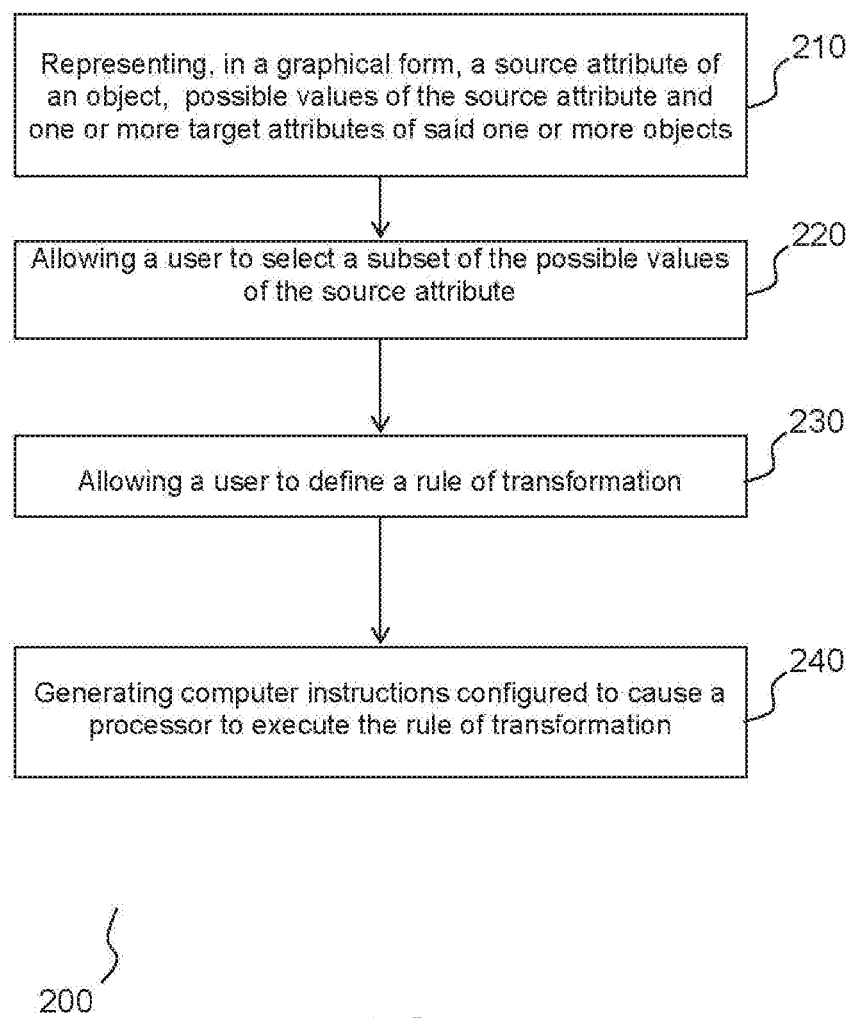
FIG. 2 displays a method to generate computer instructions to control a representation of one or more objects, said representation being defined at least by attributes of said one or more objects.

FIG. 2 displays a method to generate computer instructions to control a representation of one or more objects, said representation being defined at least by attributes of said one or more objects.

Method 200 can be used to control a representation of one or more objects. The representation may comprise one or more of a visual representation, an auditory representation, and real world objects connected to a device on which the computer instructions are executed.

Method 200 comprises a step of representing, in a graphical form, a source attribute of an object, possible values of the source attribute and one or more target attributes of said one or more objects. The object can be an object of the representation, or a further object, for example the device on which the computer instructions are executed, or an object connected to said device. Source attributes can be for example:

An attribute relative to the display of an object, for example an horizontal or vertical position, a height or width of an object, or an orientation thereof;

A physical attribute of a device on which the computer instructions are executed, for example its orientation, or a value sensed by this device, for example a temperature;

An attribute of an object which results from an input of a user, for example the position of a slider;

An attribute of a device in connection with the device on which the computer instructions are executed, for example the orientation of a pointing device;

An information received through a communication network, for instance a temperature or hygrometric sensor implanted in an outside location and connected to a low bandwidth network, or the status of a user in a social network;

A series of values produced during a computation, for instance the current number of iterations in a computation loop or the intermediate values obtained during successive approximations of a result;

etc.

In some embodiments of the invention, the source attribute can be an attribute composed from a plurality of elementary attributes. For example, if a button has two attributes that can have different values: an attribute "ButtonPressed" with possible values {"Pressed"; "Released"}, and an attribute "ButtonTouched" with possible attributes {"Touched"; "Untouched"}, the attributes can be combined within a single source attribute of the button "State" with possible values {"Pressed and Touched", "Pressed and Untouched", "Released and Touched", "Released and Untouched"}. This source attribute can thus be used as input to the method 200.

It is also possible to use a source attribute whose values are a function of values of a plurality of attributes. In an example using an object representative of a meteorological sensor, that has a "Temperature" attribute, and a "Humidity" attribute, it is possible to define a source attribute "Perceived Temperature", whose value corresponds to a human perceived temperature perceived by a human being, defined as a function of temperature and humidity. The values of this source attribute can be automatically updated, when either the value of the attribute "Temperature", or the value of the attribute "Humidity" is updated.

The source attribute can have ordered values, which can be continuous or discrete. For example, a source attribute has ordered values when it represents days of the year, or the vertical position of an object. In some preferred embodiments, the values of the source attribute are, when applicable, displayed in their natural order. It may also be symbolic values, which are representative for example of the state of an object, for example, "on" and "off" for a button. In this case, the order in which they are displayed can be arbitrary.

The graphical form can be for example a graphical interface configured to allow a user to design applications.

Different embodiments are possible to determine and display the source attribute. In a number of embodiments of the invention, representing the source attribute of the object in a graphical form comprises: representing, on the graphical interface, a list of candidate source attributes; allowing the user to select said source attribute of the object in the list of candidate source attributes. All candidate source attributes can be represented in the same time, for example by a list on the graphical form. They can also be represented as a tree structure, wherein the user can select an object, then see all the attributes of the object and select the source attributes. This may comprise displaying all possible source attributes, or filtering source attributes. Many different ways of filtering source attributes are possible, for example using statistics of the relative usage of source attributes, and filtering the most often used attributes. The source attributes can also be filtered based on a context of the graphical form. For example, the graphical form can display objects of the representation, and, when the user clicks on an object, the attributes of this object appear as candidate source attributes.

The one or more target of said one or more objects can be any attribute of an object, which has an effect on the representation. It may for example be:
   An attribute relative to the display of an object, for example an horizontal or vertical position, a height or width of an object of a graphical representation, or an orientation thereof;
   An attribute relative to an output device or capability, for example the brightness of a screen, the frequency of a sound emitted by a loudspeaker, the intensity of a light, etc. . . . The output device or capability can be collocated with the device which executes computer instructions, or a device in connection with the device which executes computer instructions;
   A settable parameter of any device accessible through a communication network, for instance the target temperature of an air conditioning system;
   A value in a computation algorithm, for instance the deviation in a random number generator;
   etc.

Step 210 allows a user to select one or more target attributes. According to various embodiments of the invention, such selection can be performed in many different ways. For example, a list of all target attributes may be displayed on the graphical form, the user can select one or more target attributes by clicking on a target attribute in the list. In other embodiments of the invention, the user clicks on one of the objects of the representation, then the graphical form displays a list of candidate target attributes for this object. In yet other embodiments of the invention, target attributes are filtered based on the source attribute. The graphical form thus displays the target attributes that are preferably modified in relation with the selected source attribute.

In a number of embodiments of the invention, the method 200 further comprises a step 220 of allowing a user to select a subset of the possible values of the source attribute.

In the context of the application, a subset can encompass all the possible values of the source attributes, but cannot be empty. According to various embodiments of the invention and types of possible values, different types of subsets of possible values, and ways of selecting them, are possible. If the source attribute has symbolic values representative of an object, a subset of some of the symbolic values can be chosen. The selection can be performed by representing, in the graphical form, a list of possible symbolic values of the source attribute, and allowing the user to select values in the list so as to form the subset.

If a source attribute has continuous values, the subset of possible values can be one or more intervals of values, defined by minimum and maximum values. If a source attribute has discrete, yet ordered values, the subset of possible values can be either a set of discrete values, or one or more intervals defined by minimum and maximum values. Thus, the selection of possible values of the source attribute may comprise representing, in the graphical form, a line or a bar in which the user selects minimum and maximum values that define one or more intervals of the subset of possible values of the source attribute.

The subset of possible values of the source attribute can be selected manually or automatically. The source attribute can be selected manually by the user selecting the bounds of the subset in an interface. It can be selected automatically as the whole set of possible values of the source attribute. Many possible rules of automatic selection are possible. The subset of possible values can be automatically selected by loading values representative of the subset from a file. The subset of possible values can also be automatically selected as the values that the source attribute takes the most often, based on a historical dataset of values taken by the source attribute. The subset of possible values can also be selected automatically as the set of all values of the source attributes that are not already included in a subset of a source attribute of a rule of transformation.

The method 200 further comprises a step 230 of allowing the user to define a rule of transformation of the subset of the possible values of said source attribute into values of target attributes of said one or more objects.

The rule of transformation defines, for each of the possible values of the source attribute, a value of target attributes. If the source attribute has symbolic or discrete values, the rule may define, for each of the symbolic or discrete values, the corresponding values of target attributes. If the source attribute has continuous or more generally numerical values, the rule of transformation can be a mathematical function that associates a value of target attributes to each value of the source attribute.

According to various embodiments of the invention, the definition of the rule of transformation can be performed in many different ways. For example, the user can parameter a pre-defined rule of transformation Pre-defined rules of transformation may be any function that has mathematical parameters. For example, the pre-defined rule of transformation can be a multiplication, the value of a target parameter being the value of the source parameter multiplied by a factor. A user can then define the rule of transformation by setting the value of the factor. This can be done in many different ways. For example, the graphical form can display a list of candidate pre-defined rules of transformation; the user selects a candidate pre-defined rule of transformation in the list and sets the values of the corresponding parameters. This allows an easy, fast and intuitive definition of rules of transformation.

The rules of transformation can also be defined by allowing the user to enter a formula using operators, and values of operands. These operators may include any operator usually used in computer science, for example arithmetic operators, operators of Boolean operation, operators for manipulating bits, etc. . . . This can be done for example by displaying, in the graphical form, an editor of mathematical formula on which the user can enter operators, and values of parameters. This allows the user to define a rule of transformation with the highest flexibility, and allows it to use complex rules such as target value=(source value+23*56)^2, without the need of such type of formula to be predefined.

The method 200 further comprises a step 240 of generating computer instructions configured to cause a processor to execute the rule of transformation.

The computer code instructions can be generated for a variety of platforms, in any type of language, for example a native language, an interpreted language or a script language. They generally consist in reading values of the source attributes, applying the rule of transformation to calculate a value of a target attribute, and set the value of the target attribute.

In some cases, values of the source attributes can be retrieved by the occurrence of an event. It may be for example the case when the source attribute is representative of an input value sensed by a sensor. For example, if the source attribute is an orientation of a device which executes the computer instructions, an "orientation" event can be fired when the orientation of the device changes.

In a number of embodiments of the invention, generating computer instructions configured to cause a processor to execute the rule of transformation consists in generating computer instructions to listen to an event corresponding to a modification of the source attribute, and, upon the occurrence of the event, retrieve the value of the source attribute as a value of the parameters of the event, execute the rule of transformation according to this value to calculate a value of target parameters, and set the values of the target parameters.

In other embodiments of the invention, values of the source attribute are set in accordance to the representation. It is for example the case if the source attribute is an attribute of one of the objects of the representation, for example a horizontal or vertical position of an object on a display.

In a number of embodiments of the invention, generating computer instructions configured to cause a processor to execute the rule of transformation consists in generating computer instructions to periodically read the value of the source attribute, retrieve the value of the source attribute as a value of the parameters of the event, execute the rule of transformation according to this value to calculate a value of target parameters, and set the values of the target parameters.

Thus, a method of the invention allows a user to easily and intuitively select source attributes, target attributes and rules of transformations that allow him/her to define the behavior of a representation. This allows defining an intuitive behavior, such as an evolution of an object according to a position of a slider, an orientation of a device, etc. Examples of controls of representations are provided, by way of example, with reference to FIGS. 4a to 4f, and 5a to 5g.

In a number of embodiments of the invention, the method can be used to produce a synchronized behavior of different target attributes of the one or more objects of the representation. In these embodiments, the method 200 further comprises repeating the steps 220, 230 and 240 for another subset of the source attribute, other target attributes, and another rule of transformation, which is to say the method 200 further comprises:

Allowing a user to select another subset of the possible values of the source attribute;

Allowing a user to select other target attributes of said one or more objects;

Allowing a user to define another rule of transformation of the another subset of the possible values of said source attribute into values of said other target attributes of said one or more objects;

Generating computer instructions configured to cause a processor to execute the other rule of transformation.

This allows a user to define the values of several target parameters based on the values of the same source parameter, and thus provides the user with a simple and intuitive way to synchronize the behavior of the objects of the representation.

In a number of embodiments of the invention, the other subset of the possible values of the source attribute is identical to the subset of the possible values of the source attribute. The target attributes are thus synchronized on one and the same subset of values. When the rule of transformation, and the another rule of transformation define a value of the target attributes and the other target attributes for each value of the source attribute on the same subset of values of the source attribute, the values of the target attributes the user is interested in are defined in a deterministic way in this subset of values.

In a number of embodiments of the invention, the rule of transformation and the another rule of transformation transform values, respectively in the subset of possible values of the source attribute and the second subset of possible values of the source attribute. They transform them respectively into values of a first target attribute of said one or more objects, and into values of a second target attribute of said one or more objects, and the second target attribute is different from the first target attribute. This allows the user to synchronize two target attributes he/she is interested in.

In a number of embodiments of the invention in which the user is able to modify a source attribute, it is possible to reverse the transformation rule, and apply a bidirectional transformation rule. It is for example the case if the user wants to synchronize the horizontal and vertical position of a rectangle. This is useful if a user wishes to always have the same pairs of horizontal/vertical positions of the rectangle.

The inversion of rules of transformation is a straightforward task. For example, if the horizontal and vertical positions of the rectangle are respectively noted Rectangle.x and Rectangle.y and a rule of transformation "Rectangle.y=2*Rectangle.x" on the subset [0;10] of values of Rectangle.x, it is possible to obtain the inverse rule of transformation by:

- Defining the corresponding subset of values of y: when Recangle.x=0, 2*Rectangle.x=0, and when Rectangle.x=10, Rectangle.y=20. Thus the corresponding subset of values of Rectangle.y is [0;20];
- Defining the inverse rule of transformation: "Rectangle.x=Rectangle.y/2";
- Generating computer instructions to cause a processor to execute the rule of transformation "Rectangle.x=Rectangle.y/2" when 0<y.

Thus, it is possible to adapt the values of Rectangle.x and Rectangle.y bi-directionally: if the user moves the rectangle horizontally, the rectangle will automatically move vertically, and if the user moves the rectangle vertically, the rectangle will automatically move horizontally. This allows an intuitive method for constraining different attributes of the representation of objects.

The examples of synchronization above are indicated for two target attributes/two rules of transformation. It will however be apparent to a skilled man that this principle of synchronization can be applied to a larger number of attributes and rules of transformation, and a skilled person may easily adjust the number of target attributes and/or rules of transformation to define according to his/her needs. For example, the user can define 3, 4, 5 rules of transformations, etc. in order to synchronize as many attributes/objects as he/she needs.

In a number of embodiments of the invention, the source attribute, target attribute, subsets of possible values, and rules of transformation can be saved and loaded, from example in/from a project, descriptor file, xml file, etc. The method 200 can be performed to create, from an empty project, transformation rules. It then allows the user to select a source attribute, then applying all the steps of method 200. It can also be performed to add one or more transformation rules to an existing project. It then consists in loading a project comprising a source attribute, and subset of possible values of the source attribute, target attributes and rules of transformation from a project or file, then executing all the steps of the method 200 to define and add an additional rule of transformation, and the corresponding computer instructions. A person of ordinary skill can easily adapt the type of storage to save and load all the elements which are constitutive of the invention according to his/her needs.

Figure 3:
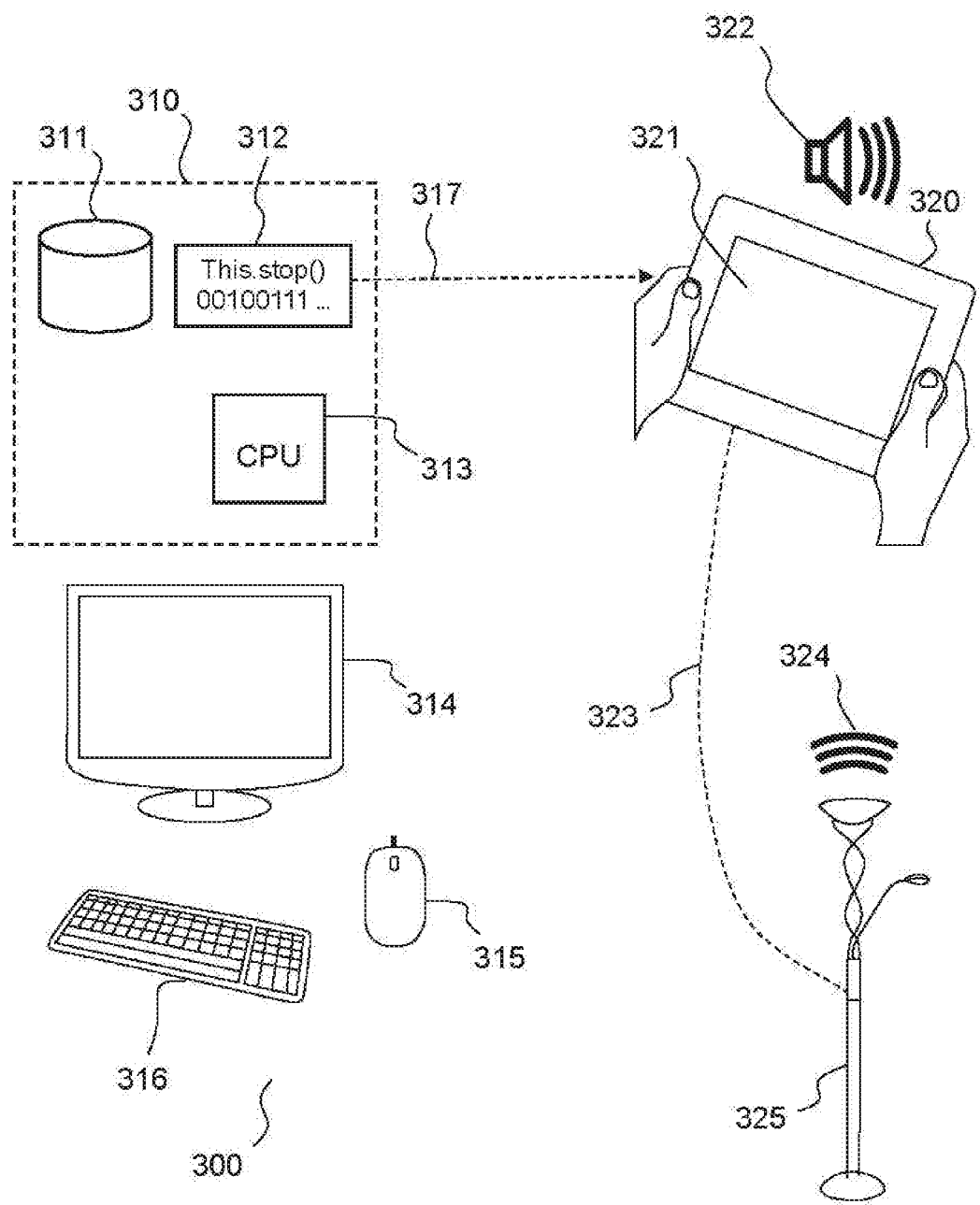
FIG. 3 displays an architecture of a system to generate computer instructions to control a representation by an output interface of one or more objects in a number of embodiments of the invention.

FIG. 3 displays an architecture of a system to generate computer instructions to control a representation by an output interface of one or more objects in a number of embodiments of the invention.

System 300 is used both to generate computer instructions to control a representation, and execute these instructions.

The system 300 comprises a workstation 310, used to define the representation, and generate computer instructions that control this representation. The workstation 310 is connected to a screen 314, a mouse 315 and a keyboard 316 to interface with a first user, for example a designer. The screen 314 may be used to display graphical forms, previews of the representation, lists of source and target attributes, etc. while the keyboard 316 and the mouse 315 may be used for example by the first user to select the attributes and rules, define the attributes of objects of the representation, and/or edit the rules of transformation. The system 300 is provided by means of non-limitative example only, and a skilled man may easily define other embodiments of a system to generate computer instructions to control a representation by an output interface of the invention. For example, the keyboard 316 may be replaced by a virtual keyboard on the screen 314, or even a voice recognition software, the mouse 315 may be replaced by an air mouse, etc. . . .

The work station 310 also comprises a storage capability 311, which can be used for example to save and load projects of representations, store computer programs for editing representations, or save the computer instructions 312 which are generated to control a representation. It also comprises a processing unit 313 to run computer programs for editing representations, and generate computer instructions 312 to control a representation. The workstation 310 also comprises an output port to send the instructions 317 to a device 320.

Other means for editing a representation and generating instructions to control representation are possible, and may be apparent for a person of ordinary skill. For example, it is possible to edit a representation and generate the corresponding computer instructions on a tablet, a computer in connection with a server which generates the computer instructions.

System 300 further comprises a device 320 configured to control a representation. In this example, the device 320 is a tablet and comprises a tactile screen 321 and a loudspeaker 322 in order to control visual and auditory objects. It is also connected through a communication link to another device 325, in this example a lamp, and may send commands through the communication link 323 to the lamp 325 in order to adjust its level of light 324. The device 320 is configured to receive and execute the computer instructions 312 to control the representation. It can receive inputs, for example if a second user touches the tactile screen, or using sensors onboard the device 320, such as a gyro to obtain the orientation of the device 320. It can also receive inputs from other devices. For example, it can receive a variable indicative of the level of light emitted by the lamp 325 through the communication link 323.

The device 320 is able, by receiving inputs and executing the computer instructions 312 that correspond at least to rules of transformation, to control a representation that comprises visual, auditory and physical connected objects. This representation can be for example all or a part of an animation or an application.

This example demonstrates the ability provided by the invention to define and control interactive representations in an intuitive way. A person of ordinary skill may adapt without effort the system 300 to his/her needs. For example, the device 320 could be a personal computer, a smartphone or a smart watch rather than a tablet. The workstation 310 could be a personal computer, a server, a tablet, etc. . . . The device 320 could be isolated, or connected to a wide number of different objects, for example a computer, a fridge, etc. . . . It may also use other outputs than a screen 321 and a loudspeaker 322. For example, it may be configured to emit odors.

FIGS. 4a, 4b, 4c, 4d, 4e and 4f display respectively an interface to generate instructions to control a representation by an output interface of two objects using a single rule of transformation, and 5 successive outputs of these two objects in a number of embodiments of the invention.

Figure 4A:
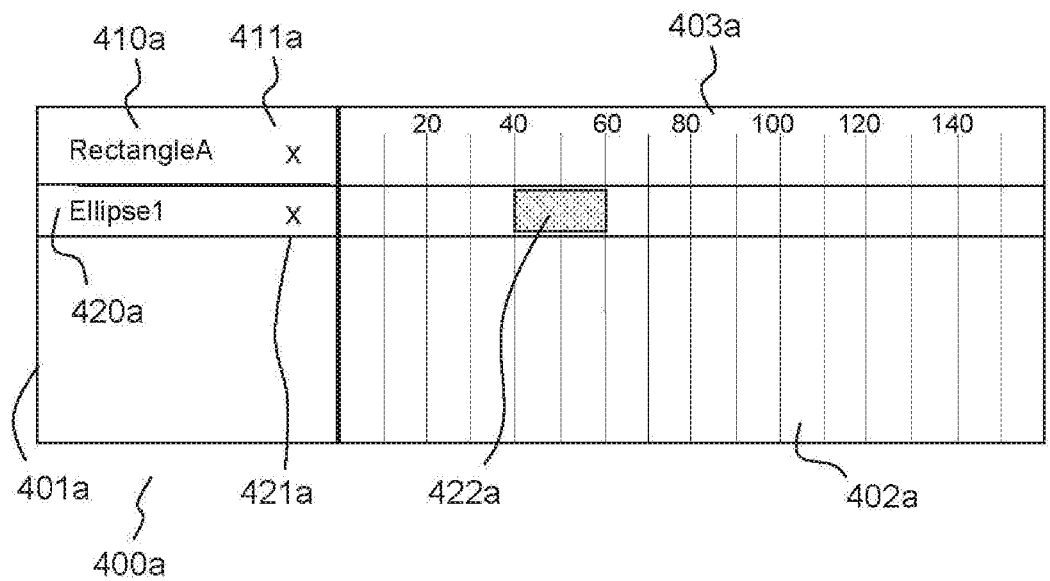
FIGS. 4a, 4b, 4c, 4d, 4e and 4f display respectively an interface to generate instructions to control a representation by an output interface of two objects using a single rule of transformation, and five successive representations of these two objects in a number of embodiments of the invention.
Figure 4B:
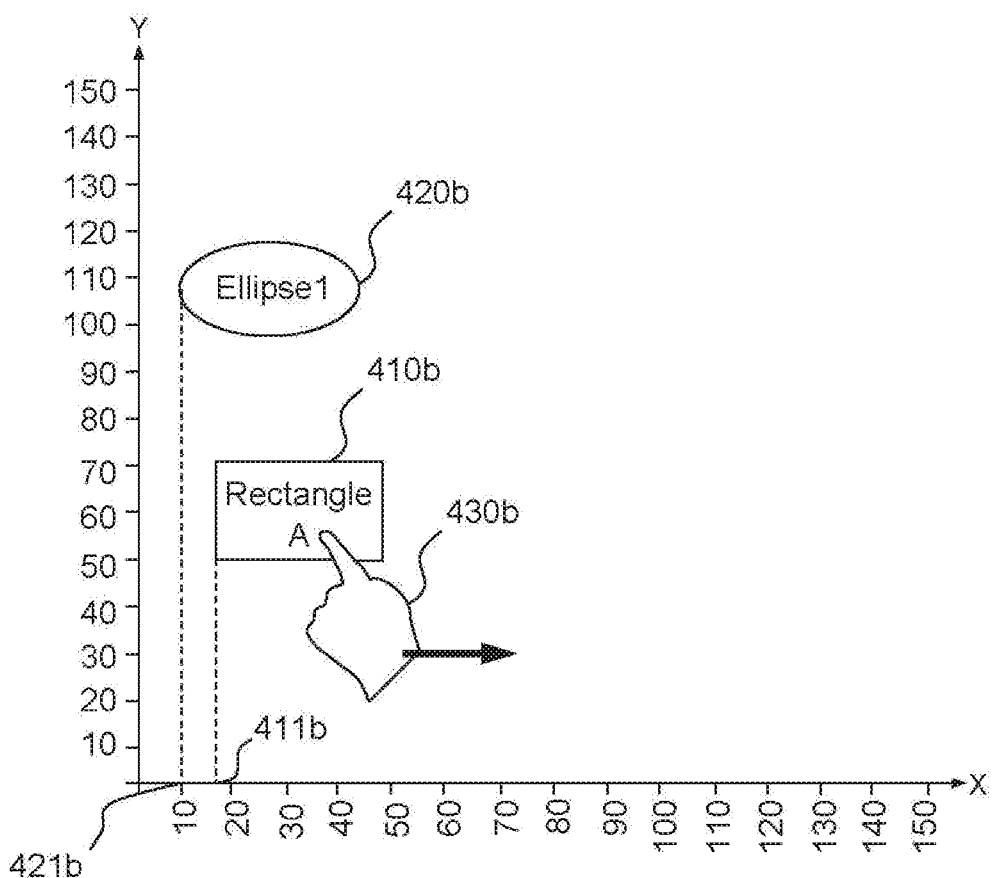
Figure 4C:
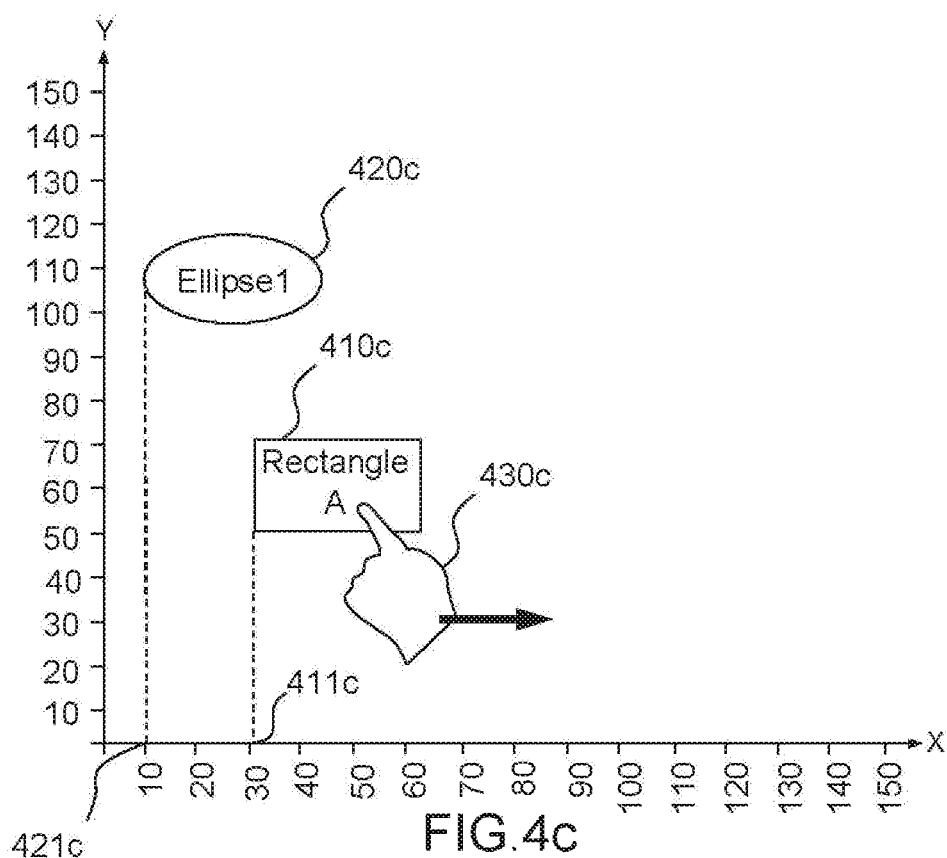
Figure 4D:
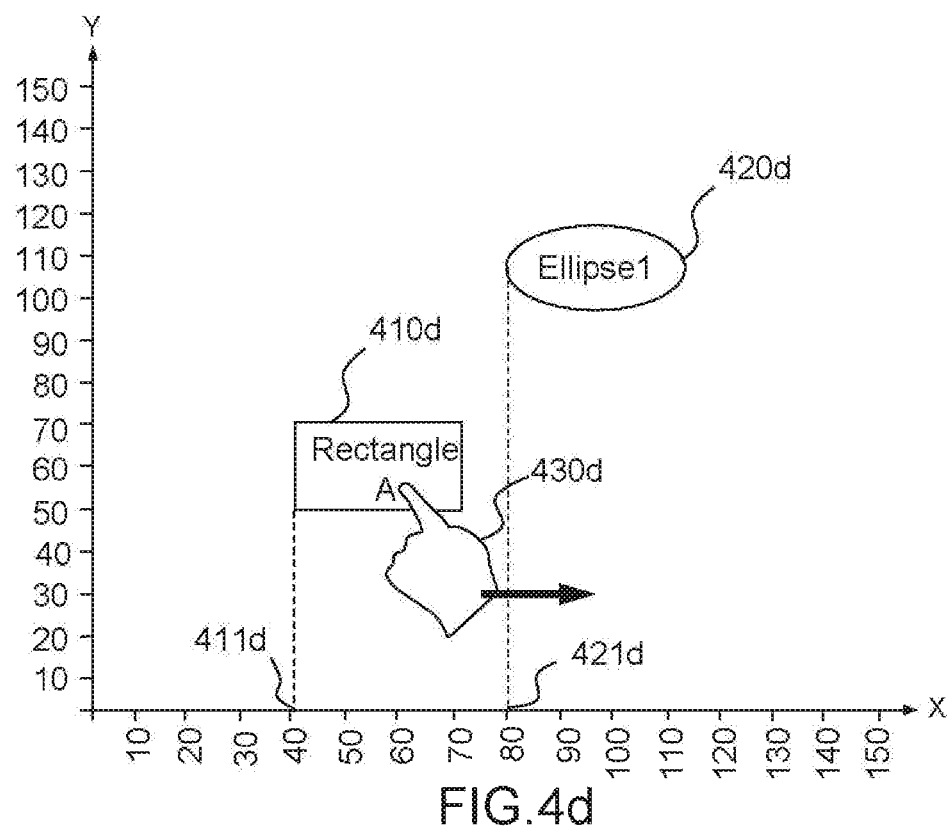
Figure 4E:
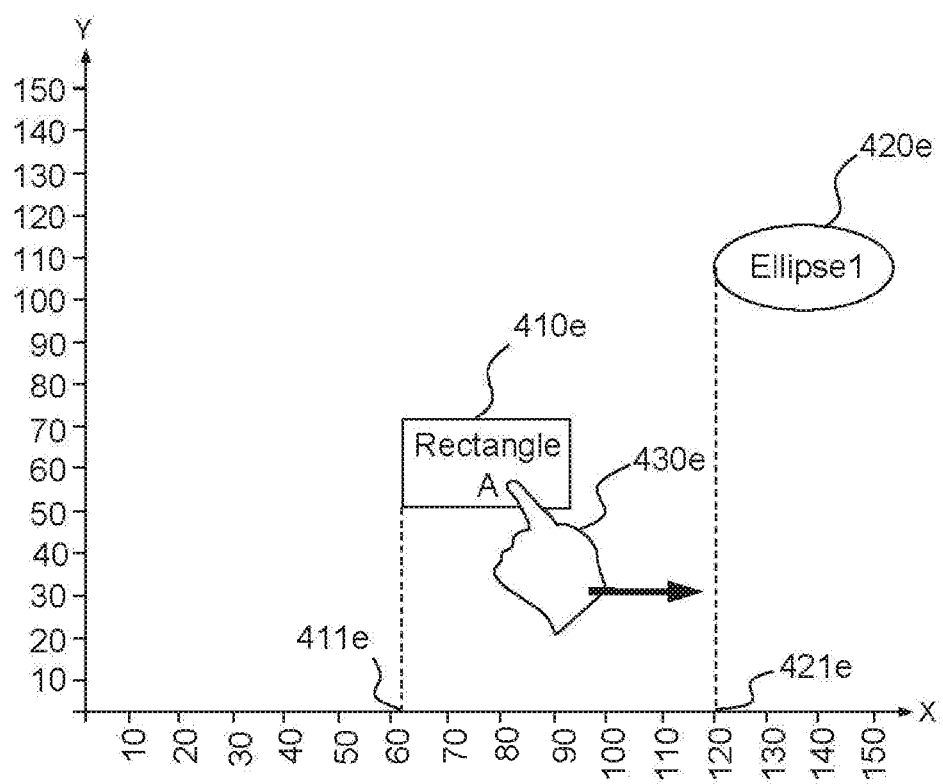
Figure 4F:
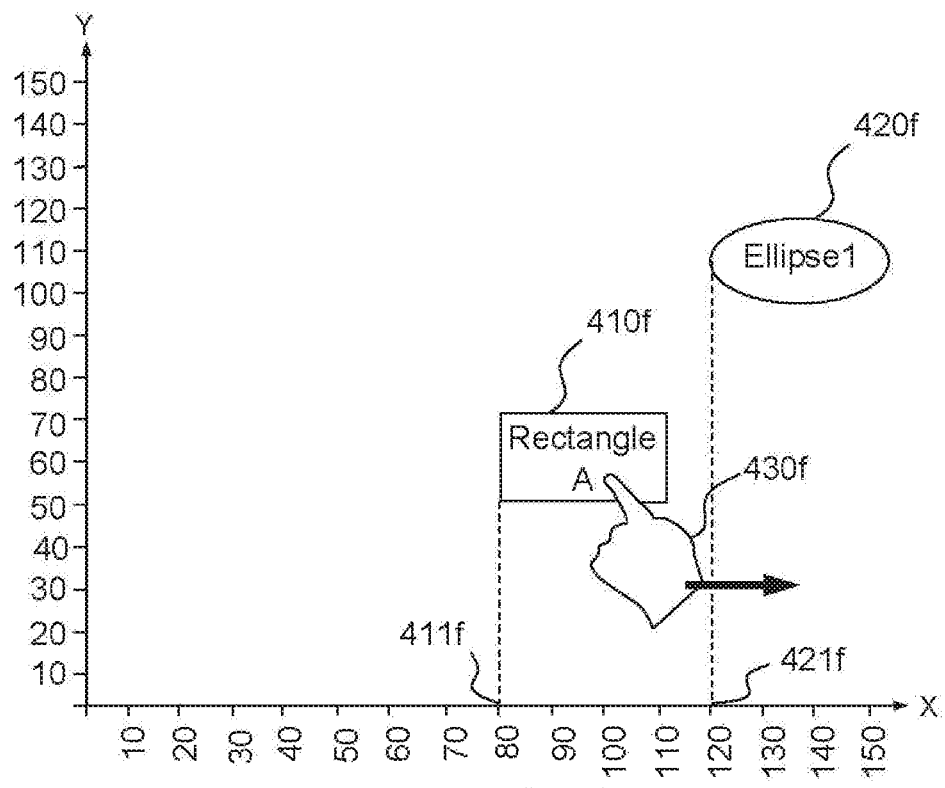

FIG. 4a displays an interface 400a to generate instructions to control a representation by an output interface of two objects using a single rule of transformation.

An interface like the interface 400a may be used for creating rules of transformation. It may also be used for displaying or modifying existing rules. Conversely, an interface like the interface 400a may be used for deleting rules, or adding new rules. An interface 400a may also allow saving or loading sets of rules of transformation.

The interface 400a comprises a first zone 401a to select the source and target attributes, a second zone 402a to select the subset of values of the source attribute, and a scale 403a where the successive values of the source attribute are indicated.

In the interface 400a, a user first selects a first object 410a, "Rectangle A", and a source attribute 411a, attribute "RectangleA.x", which represents the horizontal position, of Rectangle A. He/she then selects a second object, "Ellipse 1" 420a, and a target attribute 421a, which is the attribute "Ellipse1.x", which represents the horizontal position of the Ellipse 1. He/she then selects a subset 422a of the values of the source attribute, where to apply a rule of transformation. In this example, the subset 422a corresponds to interval [40; 60]. In this example the user defines a rule of transformation which is: "Ellipse1.x=RectangleA.x*2. This means that, when the "RectangleA.x" position is between 40 and 60, the "Ellipse1.x" position will be set to the double of the position of the RectangleA. If the position of the Rectangle1 is outside the subset, the position of Ellipse1 is not modified. It is also possible to define more complex rules, which apply to a larger subset. For example, in other embodiments of the invention it is possible to define conditional rules or combinations of conditional rules. An example of conditional rule is:

If 40<=RectangleA.x<=60, Ellipse1.x=2*Rectangle1.x*2;
If RectangleA.x<40, Ellipse1.x=80;
If RectangleA.x>60, Ellipse1.x=120.

FIGS. 4b, 4c, 4d, 4e and 4f display five successive outputs of these two objects in a number of embodiments of the invention. These outputs are obtained at least by executing computer instructions generated by the interface 400a.

The positions of Ellipse1 and RectangleA on the representation are defined by an "x" and a "y", respectively horizontal and vertical positions. The positions are defined by the horizontal and vertical axis. A user successively swipes on a tactile surface 430b, 430c, 430d, 430e, 430f the RectangleA to the positions 410b, 410c, 410d, 410e and 410f. The successive horizontal positions of Rectangle1 are 411b, 411c, 411d, 411e and 411f. Meanwhile, the successive positions of Ellipse1 are 420b, 420c, 420d, 420e and 420f, and its horizontal positions are 421b, 421c, 421d, 421e and 421f.

Initially, the horizontal position of RectangleA is 20, 411b, and Ellipse1 a horizontal position of 10 421b. The user progressively swipes RectangleA to the right. When RectangleA has a horizontal position of 30, 411c, the rule of transformation does not apply: the source attribute RectangleA.x does not have a value between 40 and 60. Thus the horizontal position of Ellipse1 is still 10, 421c.

When the value of the source attribute RectangleA.x reaches 40, 421d, the rule of transformation applies, and the target attribute Ellipse1.x equals 2*40=80, 411d. The horizontal position of Ellipse1 is then modified. The user further swipes RectangleA to the right, and the rule of transformation applies to modify the horizontal position of Ellipse1. When RectangleA.x reaches 60, 411e, the target attribute Ellipse1.x equals 120, 421e. When the user further moves RectangleA to the right, the source attribute RectangleA.x is above 60. Thus, the rule of transformation does not apply, and the horizontal position of Ellipse1 remains 120. For example, when the horizontal position of RectangleA RectangleA.x equals 80, 411f, the horizontal position of Ellipse1, Ellipse1.x, still equals 120, 421f.

FIGS. 5a, 5b, 5c, 5d, 5e, 5f and 5g display respectively an interface to generate instructions to control a representation by an output interface of a plurality of objects using three rules of transformation, and six successive outputs of said objects in a number of embodiments of the invention.

Figure 5A:
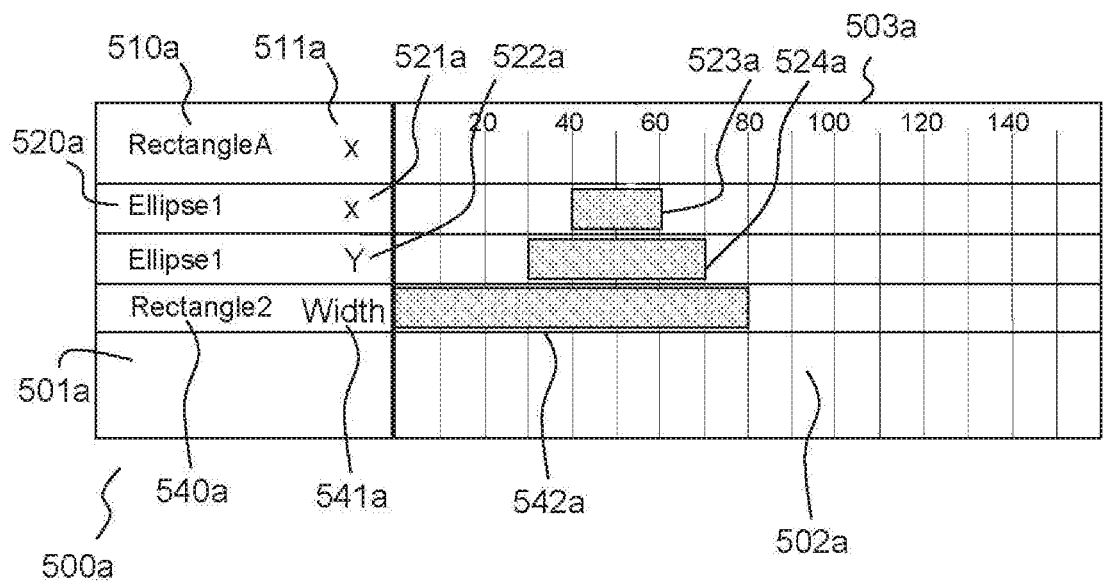
FIGS. 5a, 5b, 5c, 5d, 5e, 5f and 5g display respectively an interface to generate instructions to control a representation by an output interface of a plurality of objects using three rules of transformation, and six successive representations of said objects in a number of embodiments of the invention.
Figure 5B:
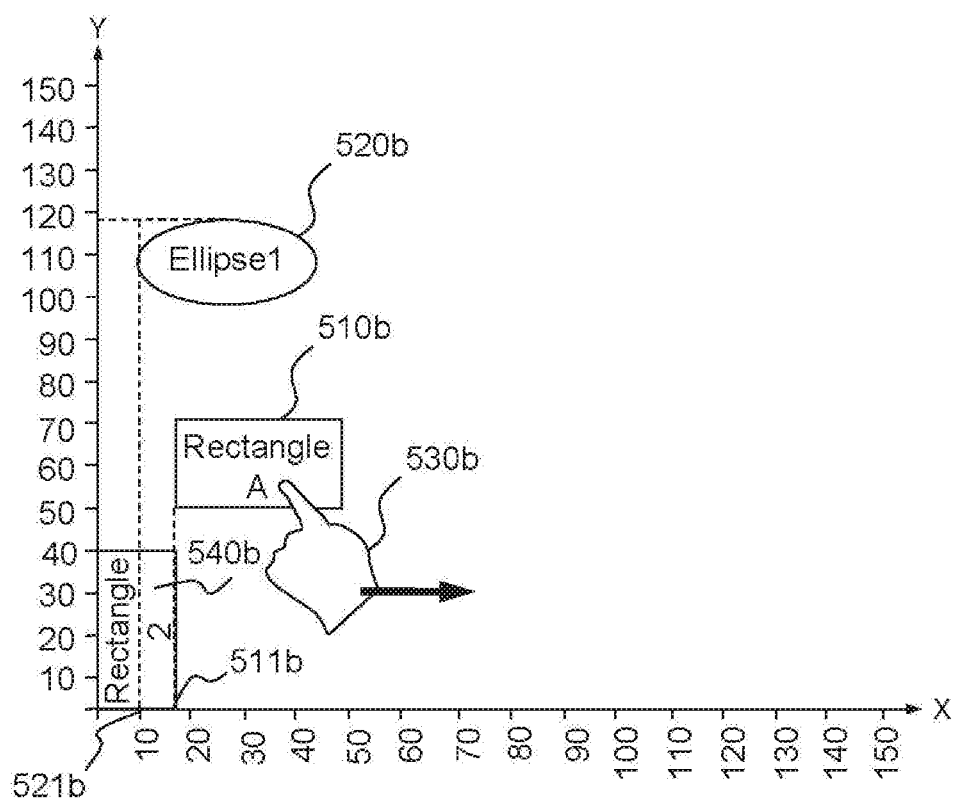
Figure 5C:
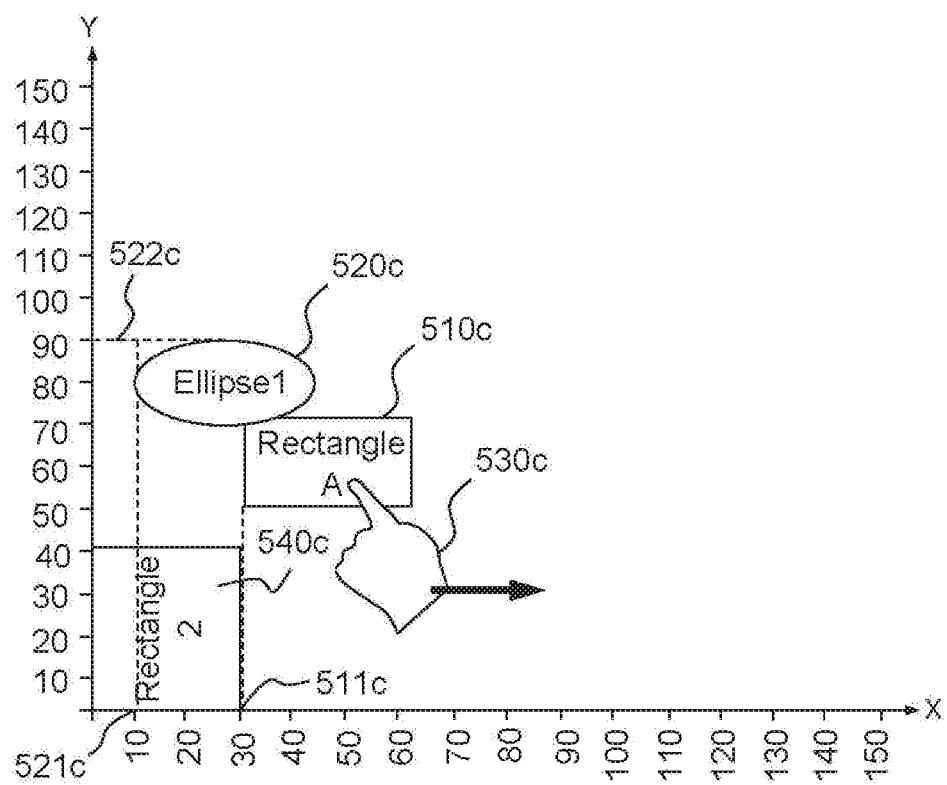
Figure 5D:
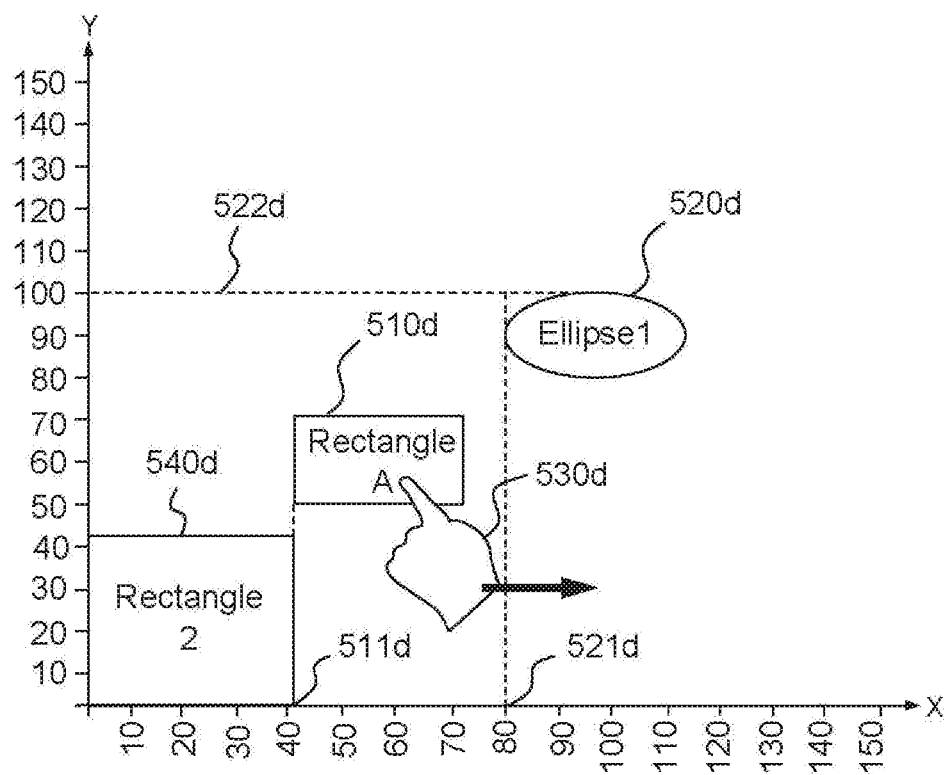
Figure 5E:
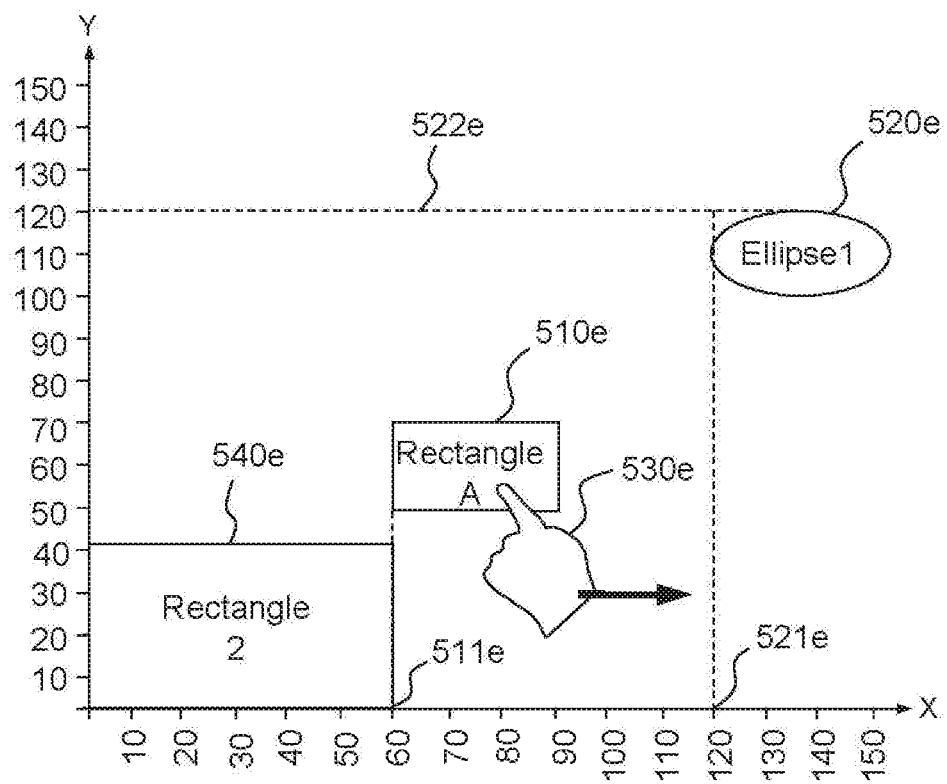
Figure 5F:
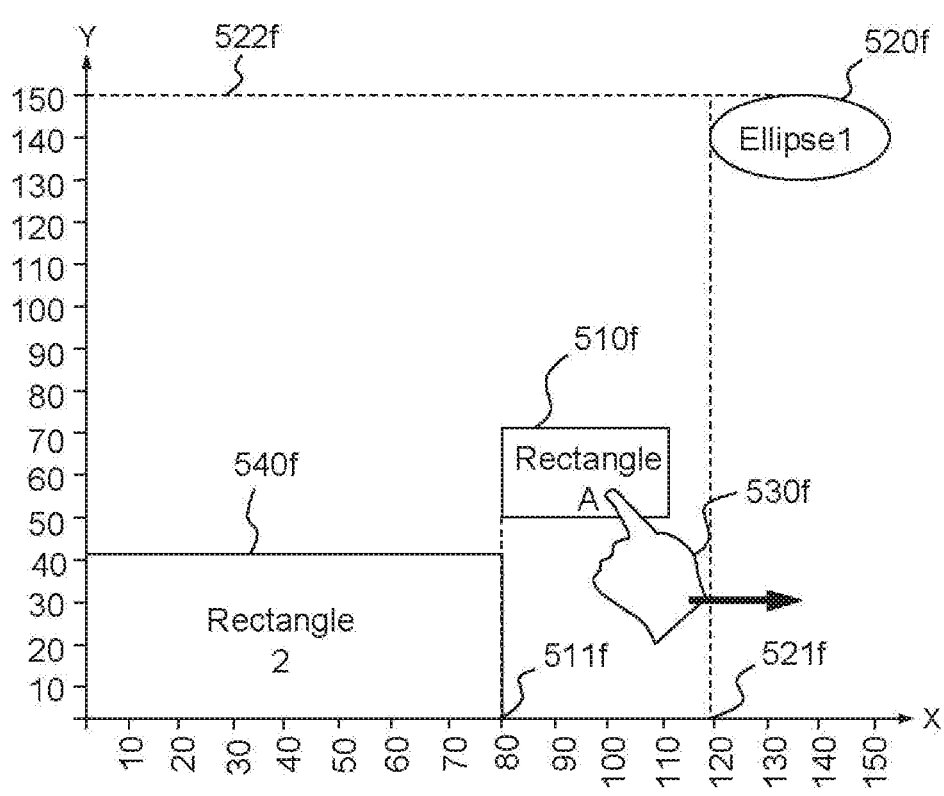
Figure 5G:
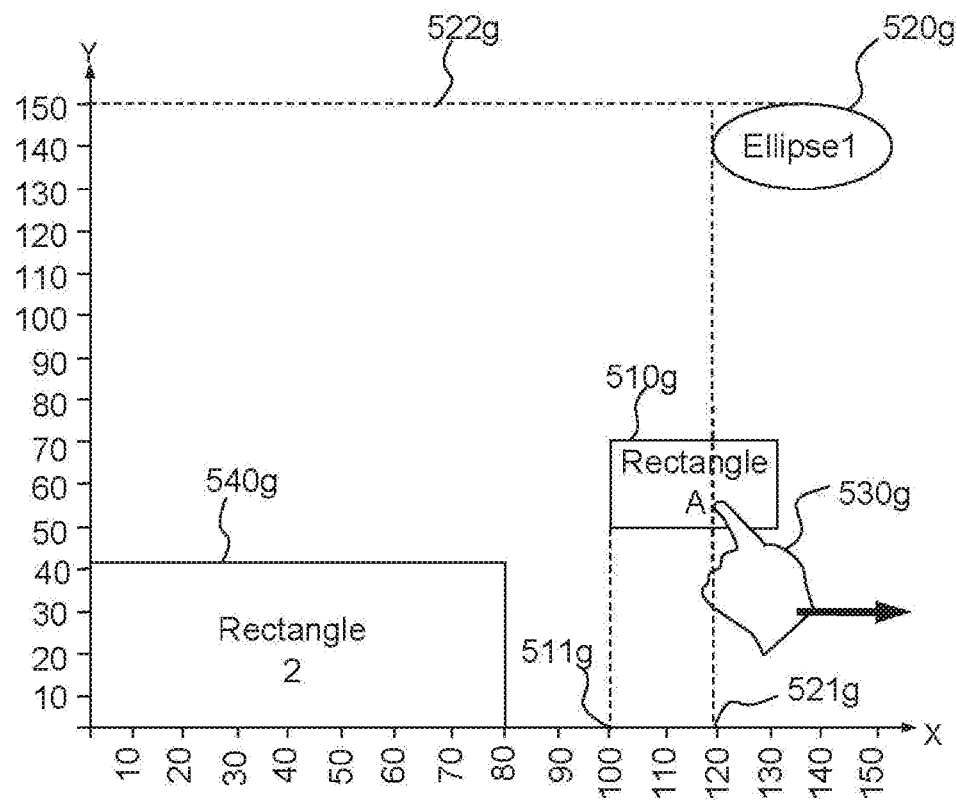

FIG. 5a displays an interface to generate instructions to control a representation by an output interface of a plurality of objects using three rules of transformation.

The interface 500a is similar to the interface 400a, the three zones 501a, 502a and 503a respectively corresponding to zones 401a, 402a and 403a.

The source attribute 511a still is the "x" attribute of RectangleA 510a.

A first target attribute is the "x" position 521a of Ellipse1 520a; a rule of transformation "Ellipse1.x=Rectangle1.x*2" applies in the subset 523a of values of the source attribute, which is to say between 40 and 60.

A second target attribute is the "y" position 522a of Ellipse1, 520a; a rule of transformation "Ellipse1.y=Rectangle1.x+60" applies in the subset 524a of values of the source attribute, which is to say between 30 and 70.

A third target attribute is the "Width" 541a of Rectangle2, 540a; a rule of transformation "Rectangle2.Width=RectangleA.x" applies in the subset 542a of values of the source attribute, which is to say between 30 and 70.

FIGS. 5b, 5c, 5d, 5e, 5f and 5g display 6 successive outputs of said objects in a number of embodiments of the invention. These outputs are obtained at least by executing computer instructions generated with the interface 500a.

Similarly to the example displayed in FIGS. 4b, 4c, 4d, 4e, 4f, the user is swiping the rectangle "RectangleA" to the right 530b, 530c, 530d, 530e, 530f, 530g. Thus, RectangleA is successively displayed at positions 510b, 510c, 520d, 520e, 520f, 520g, and its horizontal position RectangleA.x successively equals 20, 511b, 30, 511c, 40, 511d, 60, 511e, 80, 511f, and 100, 511g.

Based on the horizontal position of RectangleA, and the rules that have been defined, the horizontal and vertical positions are updated. Ellipse1 is successively displayed in 520b, 520c, 520d, 520e, 520f, 520g. The horizontal position 521b, 521c, 521d, 521e, 521f, 521g of Ellipse1 is updated using the rule "Ellipse1.x=Rectangle1.x*2" when the horizontal position of RectangleA is in the subset 523a. Conversely, it is not updated when the horizontal position of RectangleA is below 40, 511b, 511c, and above 60, 511f, 511g. The vertical position 522b, 522c, 522d, 522e, 522f, 522g of Ellipse1 is updated using the rule "Ellipse1.y=Rectangle1.x+60" when the horizontal position of RectangleA is in the subset 524a. It initially equals 120, 522b. Then RectangleA.x equals 30, 511c and enters the subset 524a. Thus the rule of transformation applies, and Ellipse1.y=Rectangle1.x+60=90, 522c. The vertical position Ellipse1.y continues to increase 522d, 522e, until the horizontal position Rectangle1.x reaches 70 and leaves the subset 524a. At this stage, the latest application of the rule of transformation assigned a value 70+60=130 to the vertical position Ellipse1.y. Then the vertical position Ellipse1.y does not change anymore, and remains at 130, 522f, 522g.

Meanwhile, the third rule of transformation assigns the horizontal position of RectangleA to the width of Rectange2, when the horizontal position of RectangleA is in the subset 542a, which is to say below 80. Thus, the width of Rectangle2, 540b, 540c, 540d, 540e, 540f equals the horizontal position of RectangleA when Rectangle1.x<=80. When RectangleA.x is above 80, the width of Rectangle2 remains at 80 540g. This rule of transformation thus defines a behavior of Rectangle2, which is always aligned to RectangleA.

This example demonstrates that the invention provides the ability to easily synchronize a number of different elements of a representation, and to define complex yet intuitive behaviors of objects of a representation depending on an input of a user.

FIGS. 6a, 6b, 6c and 6d display respectively an interface to generate instructions to control a representation by an output interface of a plurality of objects using four rules of transformation, and three successive representations of said objects in a number of embodiments of the invention.

Figure 6A:
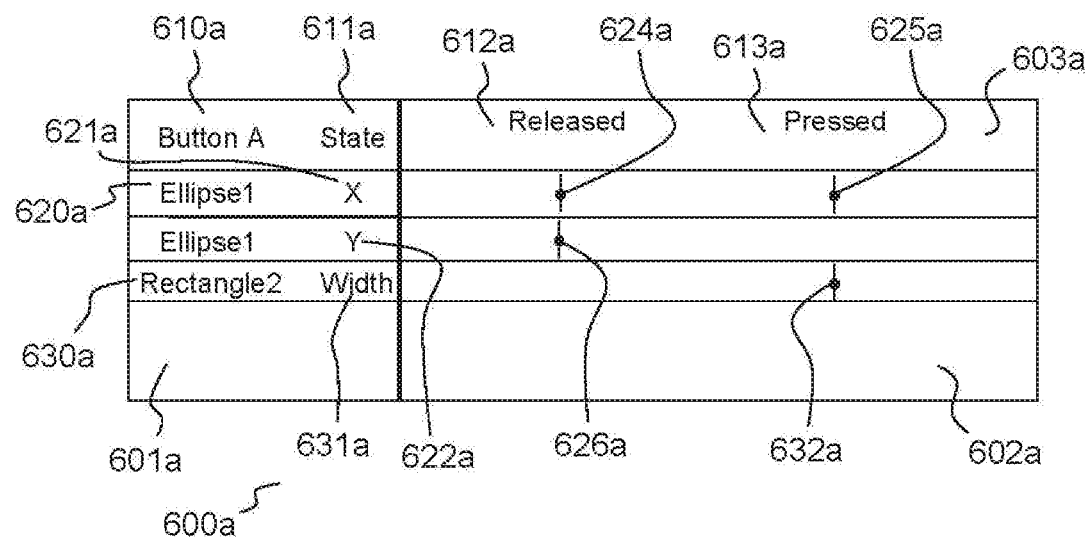
FIGS. 6a, 6b, 6c and 6d display respectively an interface to generate instructions to control a representation by an output interface of a plurality of objects using four rules of transformation, and three successive representations of said objects in a number of embodiments of the invention.

FIG. 6a displays an interface to generate instructions to control a representation by an output interface of a plurality of objects using four rules of transformation.

The interface 600a comprises a first zone 601a to select the source and target attributes, a second zone 602a to select the subset of values of the source attribute, and a zone 603a where the successive values of the source attribute are indicated.

In the interface 600a, a user first selects a first object 610a, "ButtonA", and a source attribute 611a, "ButtonA.State". This attributes has two possible values, "Released" 612a and "Pressed" 613a.

He/she then selects a second object, "Ellipse 1" 620a, and a target attribute 621a, which is the attribute "Ellipse1.x", which represents the horizontal position of the Ellipse 1. He/she then selects a subset 624a of the values of the source attribute, where to apply a rule of transformation. In this example, the subset 624a is the single value "Released" 612a of the attribute "State" of the object "ButtonA" 610a. In this example the user defines a rule of transformation which is defined by the assignation of a value to an attribute when the object "ButtonA" 610a changes state. He/she associates to the subset 624a the rule "when Button1 is released, Ellipse1.X=10".

Similarly, he/she selects a second subset 625a corresponding to the state "Pressed", and associates to this subset the rule of transformation "when ButtonA is pressed, Ellipse1.X=80". He/she then selects a second target attribute, "Ellipse1.Y" 622a, a third subset 626a corresponding to the value "Released" of the attribute "ButtonA.State" 611a. He/she associates to this subset the rule of transformation "when ButtonA is released, Ellipse1.Y=120.

He/she then selects a second target object, "Rectangle2 630a, a target attribute "Rectangle2.Width" 631a, a fourth subset 632a of the source attribute, which correspond to the state "Pressed" 613a value of the attribute "ButtonA.State" 611a, and associates to this subset the rule of transformation "When ButtonA is pressed, Rectangle2.Width=70".

In this example, the source attribute has symbolic values, and the subsets of source attributes are restricted to a single value. However it is also possible to define subset having multiple values. For example if a source attribute has three different symbolic values, it is possible to select a subset of two values, and define a rule of transformation which applies to all the symbolic values of the subset. It is also possible to define a subset which encompasses all the possible symbolic values of the source attribute.

In some embodiments of the invention different representation values of the source attribute are possible. For example, if a source attribute has eight possible values {A1; A2; A3; A4; B1; B2; B3; B4}, two representations may be possible for the source attribute:

A "Zoom in" representation, that represents the eight possible values;

A "Zoom out" representation, that displays aggregates of values;

For example, a "zoom out" representation may represent the subset of values {A1; A2; A3; A4} within an aggregate value {A}, and the subset of values {B1; B2; B3; B4} within an aggregate value {B}. Then, if the user selects an aggregate value as a subset of source value, the rule of transformation that is defined afterwards applies to all values in the subset represented by the aggregate value. For example, if the user selects the value {A}, and defines a rule of transformation that applies on {A}, the rule of transformation will apply to all values {A1; A2; A3; A4}.

This allows an even easier definition of rules of transformation, and the user can switch between a "Zoom in" and a "Zoom out" representation, for example by using the scroll wheel of a mouse.

It is also possible to switch between more than two representations. For example, an additional "Number aggregate" representation may be defined, comprising:

An aggregate value {1}, representing the subset {A1; B1};

An aggregate value {2}, representing the subset {A2; B2};

An aggregate value {3}, representing the subset {A3; B3};

An aggregate value {4}, representing the subset {A4; B4}.

Figure 6B:
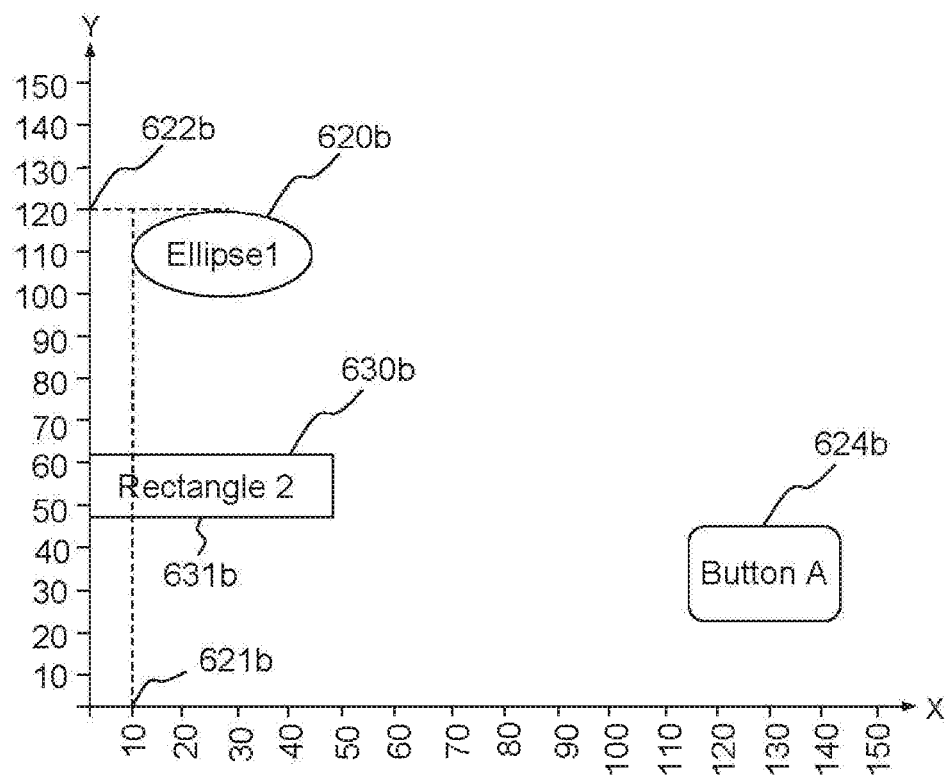
Figure 6C:
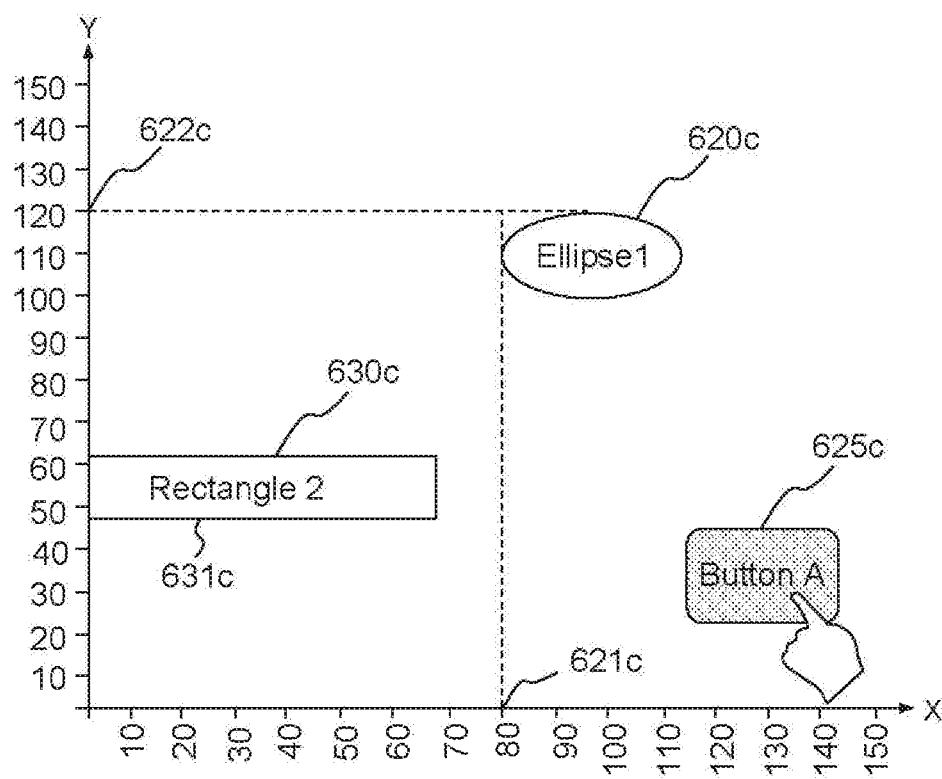
Figure 6D:
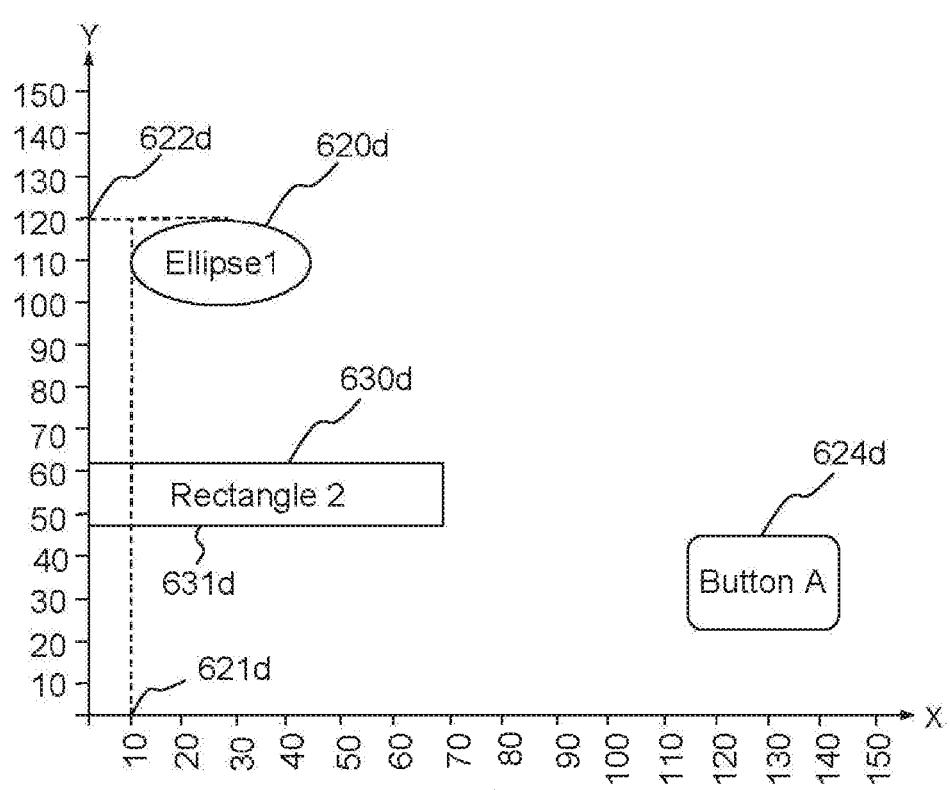

FIGS. 6b, 6c and 6d display three successive representations of said objects in a number of embodiments of the invention.

The three successive figures display three successive representations 620b, 620c and 620d of Ellipse1, three successive representations 630b, 630c and 630d of Rectangle2, and three successive representations 624b, 625c and 624d of ButtonA.

The object "ButtonA" is initially released 624b. The user then presses the button 625c, and releases it 624d. ButtonA being initially released 624b, the rules associated to subsets 624a and 626a apply: Ellipse1.X is equal to 10 621b, and Ellipse1.Y is equal to 120 622b. Meanwhile, Rectangle2.Width is initially equal to 50 631b.

When ButtonA is pressed 625b, the rules associated to the subsets 625a and 632a apply: Ellipse1.X is equal to 80 621c, and Rectangle2.Width is equal to 70 631c. Meanwhile EllipseA.Y remains equal to 120 622c.

When ButtonA is released again 624d, the rules associated to subsets 624a and 626a apply again: Ellipse1.X is equal to 10 621d, and Ellipse1.Y is equal to 120 622d. Rectangle2.Width remains equal to 70 631d.

This example demonstrates that the invention is applicable to source attributes having discrete or symbolic values. It is also able applicable in the same time source attributes having continuous, discrete and/or symbolic values.

The invention also relates to a computer program product to control a representation of one or more objects, said representation being defined at least by attributes of said one or more objects, for example a computer program product created by a method 200 according to the invention.

Such computer program product comprises computer code instructions to obtain values of a source attribute of said one or more objects, and to obtain a description of a rule of transformation of a subset of possible values of said source attribute into values of target attributes of said one or more objects. In a number of embodiments of the invention, the subset of possible values and rule of transformation have been created by a method 200 of the invention. The computer program product comprises computer code instructions configured to verify if values of the source attribute are within the subset of the possible values, and if yes, execute the rule of transformation of values of said source attributes into values of target attributes of said one or more objects.

According to various embodiments of the invention, the rule of transformation may be defined in many different ways, for example in a descriptor file, a script or in compiled code directly executable.

According to various embodiments of the invention, the subset of possible values and rule of transformation may be accessible to the program in different forms. For example, each rule of transformation may be defined by a descriptor file comprising a designation of the source and target attributes, the subset of values, and a description of the rule of transformation. Thus, the computer program product comprises computer code instructions to parse the file, retrieve the source attribute, the subset of values, and the rule of transformation. The descriptor file may be for example a XML file, or any other type of file that can be read by a program to retrieve information.

In other embodiments of the invention, the rule of transformation is a function compiled for a target platform. The computer program product is thus configured to execute the compiled function with the values of the source attribute as input. In yet other embodiments, the rule of transformation is a function written in a script language. The computer program product is thus configured to execute the scripts when the source attribute is within the subset.

Such computer program product can advantageously be enriched with new transformation, without the need for complex development tasks.

The invention also relates to a device having a graphical interface to display a representation of one or more objects, said representation being defined at least by attributes of said one or more objects.

A device of the invention is configured to receive as input from a user using the graphical interface values of a source attribute of said one or more object, execute a computer program product of the invention in order to execute rules of transformation of source values into target values, and display on the graphical interface said one or more objects according to the values of the attributes of said one or more objects.

Thus, a graphical interface of the invention can provide an intuitive experience to a user. Meanwhile, it is possible to enrich it easily by new rules of transformation.

The examples described above are given as illustrations of embodiments of the invention. They do not in any way limit the scope of the invention which is defined by the following claims.

The invention claimed is:

1. A method to generate computer instructions to control a representation of one or more objects, said representation being defined at least by attributes of said one or more objects, said method comprising:
    simultaneously representing, in a graphical form:
        a source attribute;
        an axis comprising possible values of the source attribute;
        a first target attribute of said one or more objects on a first line parallel to said axis;
        a second target attribute of said one or more objects, different from the first target attribute, on a second line parallel to said axis, and different from said first line;
    allowing a user to select, in said first line and according to the possible values of the source attribute on said axis, a first subset of the possible values of the source attribute, said first subset being visually represented on said first line in said graphical form according, to the possible values of the source attribute on said axis;
    allowing the user to select, in said second line and according to the possible values of the source attribute on said axis, a second subset of the possible values of the source attribute, said second subset being visually represented on said second line in said graphical form according to the possible values of the source attribute on said axis;
    allowing the user to define a first rule of transformation of the first subset of the possible values of said source attribute into values of said first target attribute;
    allowing the user to define a second rule of transformation of the second subset of the possible values of said source attribute into values of said second target attribute;
    generating computer instructions configured to cause a processor to execute the first rule of transformation, and the second rule of transformation.

2. The method of claim 1, wherein:
    said source attribute has ordered values;
    allowing the user to select the first subset of the possible values of the source attribute comprises allowing the user to select on said first line a first minimum and a first maximum value of the source attribute;
    allowing the user to select the second subset of the possible values of the source attribute comprises allowing the user to select on said second line a second minimum and a second maximum value of the source attribute.

3. The method of claim 1, wherein:
    said source attribute has symbolic values representative of an object;
    allowing the user to select the first subset of the possible values, and allowing the user to select the second subset of the possible values of the source attribute comprises representing, in the axis, a list of possible symbolic values of the source attribute, in which the user selects the first subset and the second subset of the possible values as a first subset and a second subset of the possible symbolic values.

4. The method of claim 1, wherein representing, in the graphical form, the source attribute comprises:
    representing, on the graphical interface, a list of candidate source attributes;
    allowing the user to select said source attribute of the object in the list of candidate source attributes.

5. The method of claim 1, further comprising allowing the user to select said two or more target attributes.

6. The method of claim 1, further comprising filtering said two or more target attributes, based on the source attribute.

7. The method of claim 1, wherein allowing the user to define the first or the second rule of transformation comprises allowing a user to parameter a pre-defined rule of transformation.

8. The method of claim 7, further comprising, prior to allowing a user to parameter the pre-defined rule of transformation, allowing the user to select the predefined rule of transformation in a list of candidate pre-defined rules of transformation.

9. The method claim 1, wherein allowing the user to define a rule of transformation comprises allowing the user to create the rule of transformation using operators and values of operands.

10. The method of claim 1, wherein generating computer instructions configured to cause a processor to execute the first and the second rules of transformation comprises:
    generating computer code instructions configured to cause a processor to retrieve a value of the source attribute, based on at least one parameter of an event;
    generating computer code instructions configured to cause a processor to compute a value of said two or more target attributes of said one or more objects, based on the value of the source attribute.

11. The method of claim 1, wherein generating computer instructions configured to cause a processor to execute the first and the second rules of transformation comprises:
    generating computer code instructions configured to cause a processor to read a value of the source attribute, at least when a time interval elapses;
    generating computer code instructions configured to cause a processor to compute a value of said two or more target attributes of said one or more objects, based on the value of the source attribute.

12. A computer program product, stored on a non-transitory computer readable medium, configured to generate computer instructions to control a representation of one or more objects, said representation being defined at least by attributes of said one or more objects, said computer code instructions being configured to:
    simultaneously represent, in a graphical form:
        a source attribute;
        an axis comprising possible values of the source attribute;
        a first target attribute of said one or more objects on a first line parallel to said axis;
        a second target attribute of said one or more objects, different from the first target attribute, on a second line parallel to said axis, and different from said first line;
    allow a user to select, in said first line and according to the possible values of the source attribute on said axis, a first subset of the possible values of the source attribute, said first subset being visually represented on said first line in said graphical form according to the possible values of the source attribute on said axis;
    allow the user to select, in said second line and according to the possible values of the source attribute on said axis, a second subset of the possible values of the source attribute, said second subset being visually represented on said second line in said graphical form according to the possible values of the source attribute on said axis;
    allow the user to define a first rule of transformation of the first subset of the possible values of said source attribute into values of said first target attribute;
    allow the user to define a second rule of transformation of the second subset of the possible values of said source attribute into values of said second target attribute;
    cause a processor to execute the first rule of transformation, and the second rule of transformation.

* * * * *